March 7, 1939.    C. E. McMANUS    2,149,532
METHOD OF FORMING LINER MATERIAL
Original Filed May 12, 1933    2 Sheets-Sheet 1
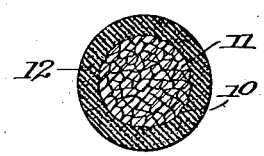
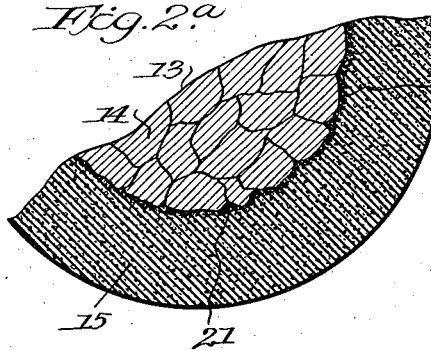
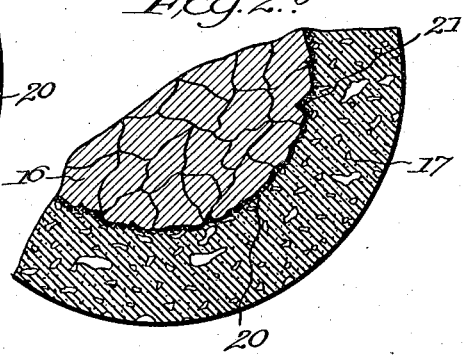
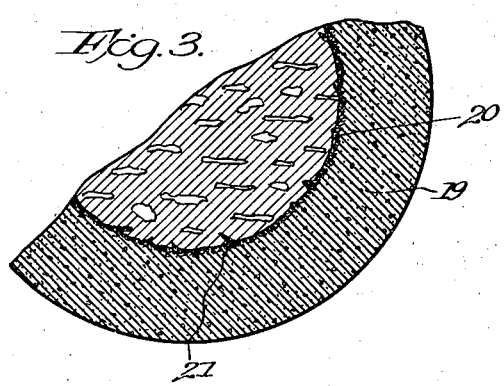
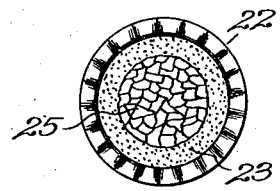
Inventor
Charles E. McManus,
By Cushman, Darby, & Cushman
Attorneys

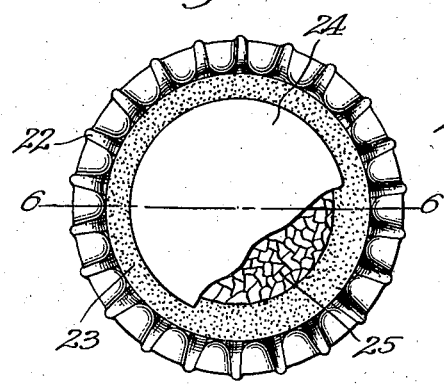
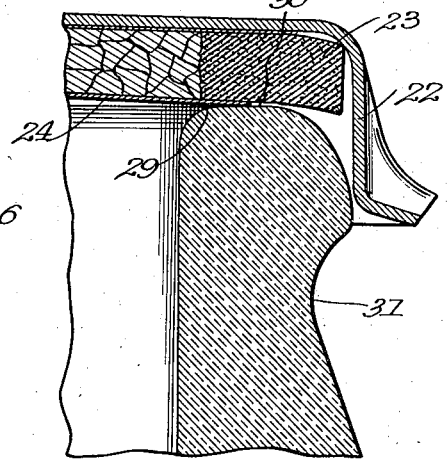
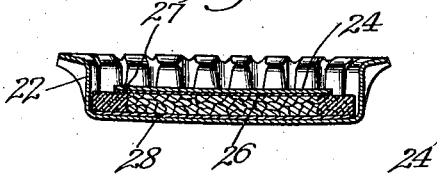
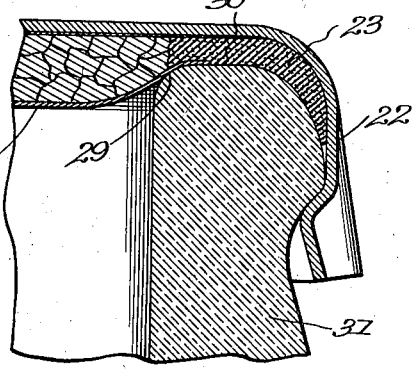
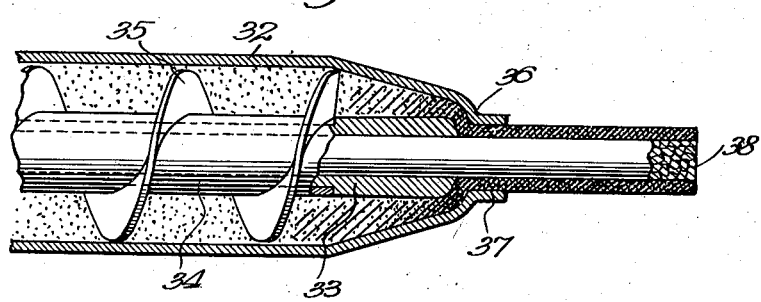

Patented Mar. 7, 1939

2,149,532

UNITED STATES PATENT OFFICE 2,149,532

METHOD OF FORMING LINER MATERIAL

Charles E. McManus, Spring Lake, N. J., assignor to Crown Cork & Seal Company, Inc., Baltimore, Md., a corporation of New York Original application May 12, 1933, Serial No. 670,799. Divided and this application May 25, 1935, Serial No. 23,527

3 Claims. (Cl. 18—59)

This invention relates to container closures particularly of the type which include a shell having a liner disc of cushion sealing material. The liner of the present application is concentrically laminated and constitutes an improvement upon the disclosure of my Patent 1,346,834, July 20, 1920.

In the new construction, the liner disc comprises a core of porous cushion material such as cork, either of granular cork composition or natural cork, and a completely surrounding or peripheral sealing portion of cellular rubber or an expanded structure of comminuted cork and cellular rubber composition as set forth in my copending application Serial No. 663,424, filed March 29, 1933. The core and peripheral portion of the liner disc are substantially integrally united by vulcanization, without the use of separate adhesives and a cross-sectionally continuous structure having a smooth and uninterrupted sealing surface is produced. The rubber flows into the pores and surface inequalities of the core to completely seal and fill the same and, therefore, in addition to the adhesive effect obtained by vulcanization of the cork and rubber, there is a further reinforced bond between the two concentric portions due to the tentacular effect which results from the vulcanized infiltrated portions of the rubber in the pores of the cork and inequalities in the peripheral surface of the core. This union is flexible and elastic, and insures that the two concentric portions will not crack or separate due to irregularities in the sealing surface or high sealing pressure.

The advantages of such a cross-sectionally continuous structure in which the concentric layers are integrally and flexibly bonded are:

(a) The continuous cross-sectional structure of the liner disc assures that it will be leak-resistant and spread uniformly and evenly under sealing pressures.

(b) The liner disc by reason of the resilience afforded by the cellular characteristic of the peripheral portion will accommodate itself to inequalities in the sealing lip of a container or the surface of the metal shell in which it is assembled, and should any abnormal conditions develop, this resilience of the cellular peripheral portion will enable it to compress or expand as the case may be, to insure a continuous seal.

The highly resilient character of the peripheral portion makes possible the obtaining of a seal without the high compression now required in the conventional crown seal, with the result that thinner gauge metal may be used. Furthermore, since there is less compression of the liner disc, the life of the same is prolonged because the greater the compression, the more the deadening of the liner.

(c) The respective areas of the core and peripheral portion can be regulated in accordance with the sealing application and preferably the peripheral portion will engage substantially the entire surface of the sealing lip of the container without being exposed to the contents from which it may be protected either by a center spot facing or a core of substantially large area. In this manner, the core need only be of sufficient area to engage the inner peripheral portion of the sealing lip and the principal seal will be accomplished by the peripheral portion. The cellular characteristics of the rubber or of the rubber cork composition give a sealing material efficient comparable to the best grade of natural cork and, in fact, in some cases is even better. Therefore, since the material of the peripheral portion is less expensive than natural cork, and equally reliable, a considerable saving is effected.

(d) The flexible and elastic union between the core and peripheral portion and the compressibility and flexibility of the liner enables it to be used under high sealing pressures and regardless of inequalities in the surface of the metal shell or the surface of the sealing lip without fear of disruption. That is to say, the liner not only accommodates itself to the conditions surrounding the sealing application, but is thoroughly reliable in that the bond between the concentric materials insures that it may spread or compress without danger of separation or cracking. This elastic and flexible bond is, in fact, a reinforced connection, first because of the vulcanization of the rubber peripheral portion to the cork, and second by reason of the infiltrated vulcanized portions of the rubber which are disposed in the pores and surface irregularities of the core, producing in effect a tentacular joint.

(e) In cases where a center spot of less diameter than the disc, but preferably of greater diameter than the core, or an overall facing of paper or metal foil is employed, an effective adhesion of the spot or facing to the liner is obtained, since the usual adhesives employed are more adherent to the cork than the rubber. Hence the cork center insures adherence of the spot or facing. This is likewise true of the cap assembly in which the adhesives employed for uniting the liner to the metal of the shell are more effective with the cork than with the rubber. When cork is included in the peripheral cellular rubber portion of the disc, the adherence of the spot thereto and of this part of the disc to the shell is improved. These are important considerations, since it is obviously desirable that the liner disc be permanently secured to the shell and also that the spot or facing be held to the exposed surface of the liner disc in a thoroughly reliable manner.

(f) A very substantial saving of cork is effected particularly in the case of liner discs upon which are superposed spot or overall facings. In such cases, the core will not come in contact with the sealing lip of the container or the contents thereof. Hence, the core is simply a filler and a very cheap grade of natural or composition cork will suffice.

(g) I find that liners of the composite cross-sectionally continuous structure of the present invention may be used in reduced thicknesses as compared to conventional discs used in crown seals, thereby giving a thoroughly efficient seal and withstanding pressures of 200 pounds and higher. Stated concretely, natural cork liners in crown seals are cut 9½ to 10 to the inch and composition cork liners are usually cut 10 to the inch. The present liner when sliced 12 or 13 to the inch gives a strong leak-proof seal, and the thinner disc has considerable advantage in that it enables also a thinner gauge of metal to be used in forming the cap shell. When it is considered that over eighty million gross of crown seals are manufactured yearly, the resultant saving will be appreciated.

The liner material of the present invention is prepared in the form of rods by an one of several processes. The peripheral portion of rubber or rubber and cork is molded about a core of the cork and both concentric layers are individually of substantially uniform cross-sectional area. The ends of the core are left exposed and the rubber or rubber-cork composition is vulcanized upon the core, so as to obtain (1) a permanent and tentacular bond, and (2) a cross-sectionally continuous structure.

Referring to the drawings:

Figure 1 is a view partly in longitudinal section showing a rod of the new material and illustrating by representation a core of natural cork or cork composition and a concentric layer of vulcanized cellular rubber or vulcanized and expanded cellular rubber and comminuted cork.

Figure 2 is a transverse section of the same.

Figure 2a is an enlarged partial transverse section of a liner made in accordance with the present invention and sliced from the rod of Figure 1.

Figure 2b is an enlarged partial transverse section of a modified liner made in accordance with this invention.

Figure 3 is an enlarged partial transverse section of a further modified liner made in accordance with this invention.

Figure 4 is a view showing a closure of the type including a metal shell and a liner constructed in accordance with the present invention applied in the usual manner, the cap disclosed being a crown cap assembly.

Figure 5 is an enlarged view of a cap constructed in accordance with Figure 4 and provided with a spot facing.

Figure 6 is a sectional view taken through the cap of Figure 5.

Figure 7 is a sectional view showing by representation the cap of Figures 4 and 5 applied to a container before the cap is crimped over the sealing lip thereof.

Figure 8 is a sectional view showing the cap of Figure 7 crimped upon the sealing lip of a container, and Figure 9 is a view in section illustrating one method of forming the liner material shown in Figure 1.

Referring to the drawings, I have illustrated in Figure 1 a rod 10 of the liner disc material from which the liner discs will be sliced or cut in the usual manner. The core is indicated at 11 and the peripheral or encircling concentric portion at 12.

The core will comprise either natural cork or composition cork, the latter composed of comminuted cork or granulated cork and a binder and given a set usually by means of heat or heat and pressure.

While I have referred to cork as the preferred form of core, it will be understood that the characteristic of the same, particularly where a center spot facing is used, which renders the cork desirable, is its porous character. This permits infiltration of the rubber into the cork and an intimate binding of the rubber peripheral portion to the cork. Other materials having this characteristic would be suitable in many instances and will at once suggest themselves to those familiar with the art.

The surrounding portion 12 will comprise vulcanized cellular rubber, that is rubber having a multiplicity of cells or pores produced by means of a suitable blowing agent and vulcanized, or vulcanized cellular rubber and comminuted cork in accordance with my aforesaid application. This composition comprises an expanded and vulcanized structure composed of a mixture of comminuted cork and cellular rubber, as particularly described in my said earlier application.

The cellular rubber composition in plastic form is applied, preferably, by molding to the natural or composition cork core. The blowing of the rubber or the blowing and expansion of the cork and rubber precedes vulcanization, but both operations take place preferably after the plastic material has been spread upon the core. In this manner, a strong adhesion is obtained between the concentric portions and furthermore by reason of the molding, and the subsequent blowing operation, the rubber or rubber-cork mass infiltrates or flows into the interstices of the cork forming the core, as well as inequalities in the surface of the core, to completely close and fill the same. Thereby, a continuous cross-sectional structure is provided and the infiltrated portions of the rubber or rubber-cork mixture upon vulcanization form an additional bond or tentacular connection between the two concentric portions. It is to be observed, therefore, that in addition to forming a continuous seal or leak-proof liner, a firm and flexible elastic bond between the two materials is secured.

In Figure 2a, the liner disc indicated as a whole at 13 has the core 14 composed of cork composition while the peripheral portion 15 comprises the expanded and vulcanized material. In Figure 2b, the core 16 is composed of composition cork and the peripheral portion 17 of vulcanized blown or cellular rubber. In Figure 3, the core 18 is composed of natural cork, while the peripheral portion 19 comprises the expanded and vulcanized material. It is to be understood, of course, that the use of a cellular rubber peripheral portion 17 is equally applicable to the natural cork core 18 of Figure 3 and that the various materials of the core and peripheral portion may be used interchangeably.

The liners illustrated in Figures 2a, 2b and 3, or modifications of the same, are produced by slicing of the rod 10. As shown, these liners have the surfaces of the core exposed, while the peripheral surface of the core has bonded thereto a concentric layer of the rubber or rubber-cork material. The liner discs are, therefore, of cross-sectionally continuous structure and the two materials are flexibly and elasticly united together.

In Figures 1 to 3, I have illustrated at 20 a densification or darkening of the rubber encircling portion 11 adjacent to the cork core 10. This darkening is occasioned by either a physical or chemical change, probably due to the blowing and vulcanization treatment and the contact of the rubber with the cork.

In the same views, I have illustrated at 21 the manner in which the rubber or rubber-cork composition infiltrates or flows into the interstices of the cork and inequalities in the peripheral surface of the core.

These two characteristics of the liner disc of the present invention are of particular importance. The adhesive connections between the core and concentric peripheral portion is not only a firm bond, but a flexible and elastic one as well. The infiltrated portions of the rubber or rubber-cork composition as shown at 21 form an additional securing means, in effect, being tentacles, and not only reinforce the union between the concentric laminae, but impart additional strength, flexibility and elasticity to the liner. This is important because the two materials forming the core and peripheral portion will in many cases have different co-efficients of resilience, i. e., compressibility and rebound, and the sealing surfaces likewise will present irregularities, so that this strength and flexibility and elasticity are availed of to obviate any possibility of cracking or separating of the two concentric members.

I have referred herein also to a cross-sectionally continuous structure and by that I mean, as will be apparent from Figures 1 and 2 and the enlarged views of Figures 2a, 2b and 3, that a continuous leak-proof body, which is also flexible and resilient, is produced. While the character of the two materials may differ, they are for purposes of cap assembly formed into a unitary and continuous cushion liner.

In Figure 4, I have illustrated a cap of the type including a metal shell, specifically a crown cap, having the shell 22 and the liner of the present invention indicated at 23. In Figure 5, I have illustrated a similar type of cap and liner, the assembly being provided with a center spot facing 24, which is superposed upon the exposed surface 25 of the core and entirely covers the same. This facing, it will be noted, is of larger area than the core 11 and of less diameter than the overall diameter of the liner disc. In Figure 6, the cap of Figure 5 is illustrated in section and it is to be understood that this sectional view is also representative of the cap assembly of Figure 4.

The facing 24 is preferably acid and alkali resistant, as well as oil and waterproof, and is constructed of paper, tin or aluminum foil or other resistant material. It is united to the liner by a stratum of adhesive 26, which may be heat and pressure sensitive such as gutta percha, or heat coaguable such as albumen. Suitable resistant facings in fluid form having inherent adhesive characteristics may be applied to the core, for example, nitrocellulose and cellulose acetate, in lieu of paper or metal foil spot or overall facings.

I find that the adhesives or adhesive facings are adherent to the rubber peripheral portion, particularly when the latter contains cork, so that not only is the spot firmly secured to the exposed surface 25 of the core, but is also very securely bonded to the adjacent peripheral portion of the concentric rubber layer, as shown at 27. In the case of center spot facings, since the surface of the core 25 is entirely concealed and since the spot overlies the adjacent peripheral area of the concentric rubber portion, the core may be made of a very cheap material. For example, an inferior grade of natural cork may be employed and in the case of a cork composition, this may be of lower density than that customarily used and likewise may be of inexpensive make-up. Stated again, the core in the case where spot facings are used, may simply have the function of a cushion filler and other suitable porous materials may be employed.

The liner disc is united to the interior face of the crown shell by a stratum of adhesive 28, as shown in Figure 6. Such adhesives are usually heat and pressure sensitive lacquers and I find that as with the case of the spot, the liner is more firmly and permanently united to the shell than is the case with ordinary overall rubber discs. That is, the adhesives have a particular affinity for the cork and for the rubber containing cork, and this is availed of to produce a very reliable union between the liner and the shell.

Referring to Figure 7, the relative areas of the core and peripheral portion will be understood. It is preferable that the rubber be maintained out of contact with the liquid contents in the container. For this reason, the area of the cork core will be made of a size as to engage the inner peripheral surface 29 of the sealing lip 30 of the container 31. This is particularly important in connection with the cap shown in Figure 4. As regards the cap shown in Figure 5, since the spot facing 24 completely overlies the surface 25 of the core, this is not material, although I find it desirable to have the filler or cork center of an area to likewise engage the inner peripheral surface 29 of the sealing lip.

Since the peripheral portion of the liner is of substantial area, two results are obtained, (1) a reduction in the amount of cork required to produce the core, and (2) a more complete advantage may be taken of the excellent sealing qualities of the cellular rubber or vulcanized and expanded rubber and cork composition. In Figure 8, the cap is shown crimped in position upon the sealing lip 30 and it is to be noted that the cellular rubber or cellular rubber and cork flows freely and evenly to thoroughly seal the joint. Its action is comparable to the highest quality of natural cork and because of its remarkable resilience, it acts to maintain a constant efficient seal.

It is to be noted that the facing 24 completely conceals the cork core, so that there is no opportunity for contamination of the products, regardless of the quality or the composition of this filler.

Where a spot facing is not employed, and as heretofore stated, the cork core will engage the peripheral portion 29 of the sealing lip, so as to exclude the possibility of contact of the contents with the rubber sealing portion. This latter, it will be noted, in each case constitutes the principal sealing material between the cap and the sealing lip and substantially completely overlies the sealing lip.

The importance of the flexible and elastic adhesive bond produced by vulcanization of the rubber and cork layers, and the value of the additional tentacular bond obtained by the infiltration of the rubber into the pores and inequalities of the core will be well understood upon reference to Figure 8, since notwithstanding the high sealing pressures usually resorted to in connection with pressure beverages or vacuum sealed containers, the sealing liner of the present invention will not disintegrate or disrupt or crack. For example, a pressure of 200 pounds or better has been actually used with very excellent results. This is all the more remarkable when it is considered that the liner discs are of thinner gauge than those usually employed, i. e., sliced 12 or 13 to the inch. This characteristic in addition to cutting down the cost of the liner, also enables a thinner gauge of metal to be used for the shell. This latter is true because the highly resilient character of the peripheral portion enables a seal to be obtained without the high compression now resorted to with conventional liners. The cellular nature of the peripheral portion moreover assures a longer life to the seal.

While I have referred herein to a spot facing 24, it will be understood that I may use a paper or metal foil overall facing coextensive with the liner disc. Such facing as with the facing 24 will be acid, alkali and moisture resistant in accordance with the particular application.

In Figure 9, I have illustrated one method of forming the liner material illustrated in Figure 1. This may be accomplished in various ways and the process and apparatus now to be described represents a preferred form.

An elongated chamber 32 is provided with a hollow guide or extrusion member 33 extending longitudinally thereof, and mounted on the tubular member 33 is a rotatable sleeve 34 carrying a conveyor screw 35.

The plastic mass of rubber or cork and rubber is disposed in the chamber 32 externally of the tubular member 33. This plastic mass will contain a suitable blowing agent and a vulcanizing agent. They will be selected so that the blowing agent will react under a lower temperature than the vulcanizing agent, whereby immediately following the blowing action, vulcanization takes place, so that the cellular or cellular and expanded structure will be vulcanized before any opportunity of collapse of the pores or cells can take place.

The hollow member 33 is adapted to loosely receive a preformed core 11 of natural or composition cork. It may also loosely receive a core of relatively soft composition cork which has not been given a final cure or set. Again, composition cork material may be fed into the outer end of the tubular member and extruded therefrom by means of a screw and suitable forming means to form the cork rod in the coating machine.

The plastic rubber mass or rubber and cork mixture is moved by the screw 35 toward the extrusion outlet 36 of the chamber 32. Simultaneously, the core is delivered from the adjacent outlet end of the tubular member 33. The surface of the core and the interior circular wall surface 37 of the extrusion outlet 36 in effect form a mold for the plastic rubber mass. Also, the continuous feed of the plastic rubber mass in the case of preformed cores and by reason of the molding or compression of the rubber mass just described, will act to not only spread the rubber mass about the core and mold the same thereto, but in addition the frictional engagement between the rubber mass and the preformed core will cause the rubber mass to draw the core through the tubular member 33. Of course, in the case of a simultaneously extruded core, this result will likewise take place, but it is necessary to have means to form the core, i. e., to compress, as well as force, the core through the tubular member.

The molding and spreading operation which takes place at the ejection outlet of the chamber has the very important function of forcing the plastic rubber mass into the cells of the cork and into the surface inequalities thereof. Furthermore, this molding and compression of the plastic rubber mass and cork core assures that a cross-sectionally continuous structure will be formed. It will be understood that the core is of uniform cross-sectional area and that the concentric layer of cellular rubber or cellular rubber and cork will likewise be of substantially uniform thickness.

In the case of a soft, uncured, preformed core of composition cork, the infiltration or penetration of the rubber mass into the interstices of the cork and surface irregularities thereof, will take place to a very marked extent and the tentacular connection will be thereby enhanced.

The rod extruded from the outlet 36 has the ends of the core exposed as shown at 38 and such rod, in continuous or properly severed lengths, is passed to a vulcanizing and blowing chamber, where the rubber is blown and substantially immediately thereafter vulcanized. Preferably, the blowing takes place in a suitable mold, so that a smooth and continuous surface is formed. In addition, the expansion of the rubber or cork and rubber serves to further force the rubber into the interstices and surface inequalities of the core to enhance the interlocking effect between the two concentric layers. The substantially immediate vulcanization, as before stated, prevents any collapse of the pores or cells produced by the blowing operation.

In connection with the blowing and vulcanizing operations, it will be understood that these may take place in the same mold or former, the temperature being controlled to promote the initial blowing and the subsequent immediate vulcanization.

Where the cork composition core is simultaneously extruded with the extrusion of the plastic mass or is in the form of a soft, preformed and uncured core, the curing of the core will take place in the mold during the blowing and vulcanizing step. That is to say, the heat utilized in promoting the blowing and vulcanization will be used to impart a set or cure to the binder of the cork composition.

The blowing and vulcanizing operation has the very important effect of causing a very firm and permanent union between the rubber or rubber-cork composition and the composition or natural cork core as the case may be. As stated, in addition to this adhesive union between the rubber mass and the cork core, there is produced the additional tentacular union. By reason of this double bond between the concentric members, a strong, flexible and elastic connection between the peripheral portion and the core is assured. When the rod is severed or sliced, the liners will be cross-sectionally continuous, and have a smooth and uninterrupted sealing surface. They are efficient in relatively thin widths and the peripheral portion possesses a resilience enabling it to accommodate itself to various irregularities between the surfaces to be sealed.

Instead of proceeding as above, I will wrap either spirally or by straight wrapping a narrow web of the cellular rubber or cellular rubber and cork about a preformed rod or core of natural cork or cured cork composition or a preformed rod or core of uncured cork composition preferably as the latter is formed or extruded. Thereafter the rubber or rubber and cork is blown and expanded and vulcanized as described above. The seam produced by winding a narrow strip of the plastic material about the rod will be eliminated by the blowing and vulcanization, forming a continuous integral and homogeneous peripheral layer, as shown in Figures 1 and 2.

Further, I will wrap the core or rod of natural or composition cork, the latter cured or uncured in a length of the plastic material of proper width, and blow and vulcanize as described. This, like the other methods, will be continuous if desired, the rod being fed longitudinally upon the sheet and the same wrapped or compressed continuously about the core. The longitudinal seam at the meeting edges of the sheet wrapper will disappear upon blowing and vulcanization.

Also I will place a sheet of the plastic material of suitable width and length in a former and deposit on the sheet the proper amount of composition cork. The core and peripheral layer will be formed up progressively by bending the ribbon or sheet transversely to enclose the core and to assure proper density and cross-sectional area to produce the concentric laminated rod as shown in Figure 1. The rod will have the rubber or cork and rubber then blown or expanded and vulcanized.

With each of the several wrapping methods suitable pressure will be applied to cause infiltration of the plastic material into the core.

It will be understood in each case that the wrapping whether in narrow strips or sheets may be formed simultaneously with the production of the core and the two fed continuously to the wrapping instrumentality.

In each case the seam will be eliminated by the blowing and vulcanization to form an integral covering layer, and the tentacular connection will likewise be produced.

Where the cork composition is uncured, the binder will be cured simultaneously with the blowing and vulcanization.

While I have illustrated herein the liner applied to a crown cap, since this is representative of the severe conditions to which a liner of this character is subjected, it will be understood that the liner is useful in connection with various caps of the type which include a shell.

This application is a division of my co-pending application Serial No. 670,799, filed May 12, 1933.

I claim:

1. The method of forming a composite material comprising continuously extruding a mass of cork to form a cork body and simultaneously extruding around the said body a layer of rubber.

2. The method of forming a composite material comprising continuously extruding a mass of comminuted cork and a binder to form a cork body and simultaneously extruding around the said body a layer of rubber.

3. The method of forming a composite material comprising continuously extruding a mass of comminuted cork and binder to form a cork body and simultaneously extruding around the said body a layer of rubber containing a vulcanizing agent.

CHARLES E. McMANUS.